Sept. 19, 1944. A. W. FAHRENWALD Re. 22,546

CLASSIFICATION

Original Filed March 6, 1940 4 Sheets-Sheet 1

INVENTOR.
ARTHUR W. FAHRENWALD,
BY Austin Middleton
ATTORNEY.

Sept. 19, 1944. A. W. FAHRENWALD Re. 22,546

CLASSIFICATION

Original Filed March 6, 1940 4 Sheets-Sheet 2

INVENTOR.

BY ARTHUR W. FAHRENWALD,

Arthur Middleton

ATTORNEY.

INVENTOR.
ARTHUR W. FAHRENWALD,
BY Arthur Middleton
ATTORNEY.

CLASSIFICATION

Original Filed March 6, 1940 4 Sheets-Sheet 4

INVENTOR.
ARTHUR W. FAHRENWALD,
BY Austin Middleton
ATTORNEY.

Reissued Sept. 19, 1944

Re. 22,546

UNITED STATES PATENT OFFICE 22,546

CLASSIFICATION

Arthur William Fahrenwald, Moscow, Idaho, assignor to The Dorr Company, Inc., New York, N. Y., a corporation of Delaware Original No. 2,301,937, dated November 17, 1942, Serial No. 322,455, March 6, 1940. Application for reissue January 22, 1943, Serial No. 473,233

9 Claims. (Cl. 209—423)

The invention relates to process of and apparatus for the hydraulic separating, classifying or fractionating of pulp bearing different types of solids of uniform or even different sizes, or bearing solids of the same type but of different sizes, or bearing mixtures of the foregoing; such a pulp is exemplified by what is known as metallurgical pulp or that which may be known as pulp because of the solids including miscellaneous mixtures such as earth bearing materials including gravel, clay, or the like, wherein there are included relatively large or quickly settleable solids frequently referred to as sands or concentrate and light or fine particles of a character less readily settleable—or which are settleable only with difficulty or even after special preparatory treatment—and which pass off as suspended solids in the outflowing liquid in a form of liquid-solids mixture which is commonly referred to as slimes.

The process or apparatus is also applicable to the treatment of metallurgical pulps bearing relatively heavy metallic particles such as gold and which particles although small, are more readily settleable than the sand in which they are found or exist.

An object of the invention is to provide a process of and for the fractionating of pulps or mixtures of readily settleable solids and solids which are not readily settleable whereby for the performing of the process there may be employed apparatus which is relatively small in size and efficient and effective in operation as compared with the present-day apparatus.

I have developed a novel process and apparatus of a continuous mode or type which for the performance and operation thereof is based upon the fact that a liquid-solids body of pulp may be established in a classifying zone or area and be maintained therein in a condition in which the settled solids and that section of the liquid in which they are primarily found constitute a mobile mass which is attainable and realizable by the proper actuated movements imparted to an underlying constriction member having numerous discharge openings or orifice portions from which water is forcibly discharged upwardly into the overlying liquid solids body in quantities sufficient for realizing the desired classifying operation.

According to the process and apparatus the liquid-solids body wherein the mobile mass is caused to exist is continuously supplied with pulp fed thereto, it is maintained at a relatively constant level because of an overflow weir over which liquid with fine particles therein passes as slimes. Provision is made for an outflow or hydraulic passing of the larger or more readily settleable type of solids from the bottom of the body as and when an unbalanced condition is created or becomes established sufficient to cause such outflow because of a building up of solids and increase of density within the body sufficient to overcome a relatively constant back pressure which is provided and maintained for preventing an outflow of solids except when such unbalanced conditions exist at the outflow region leading from the lower portion of the body. In this connection it will be noted that in the performing of the process and in operating the apparatus there is employed means for insuring a constant back pressure which can be relied upon for balancing the hydrostatic pressure or static head at the bottom or lower portion of the liquid-solids body except when incident to and following the feeding of pulp to the body there is realized the increase in the density and solids loading of the body with a consequent pressure head at the lower portions of the body sufficient to overcome said back pressure.

The various objects and aspects to which the invention is directed primarily revolve about the features broadly referred to above.

Further objects, aspects and features of the invention will be more vividly brought out by the more detailed description which follows and they are more sharply defined or distinguished in and by the claims hereof.

In the following description and in the claims, parts will be identified by specific names for convenience, but they are intended to be as generic in their application to similar parts as the art will permit. In the accompanying drawings there has been illustrated the best embodiment known to me, but such embodiment is to be regarded as typical only of many possible embodiments, and the invention is not to be limited thereto.

Reference is now made to said accompanying drawings which form a part of this specification.

In said drawings—

Figure 1:
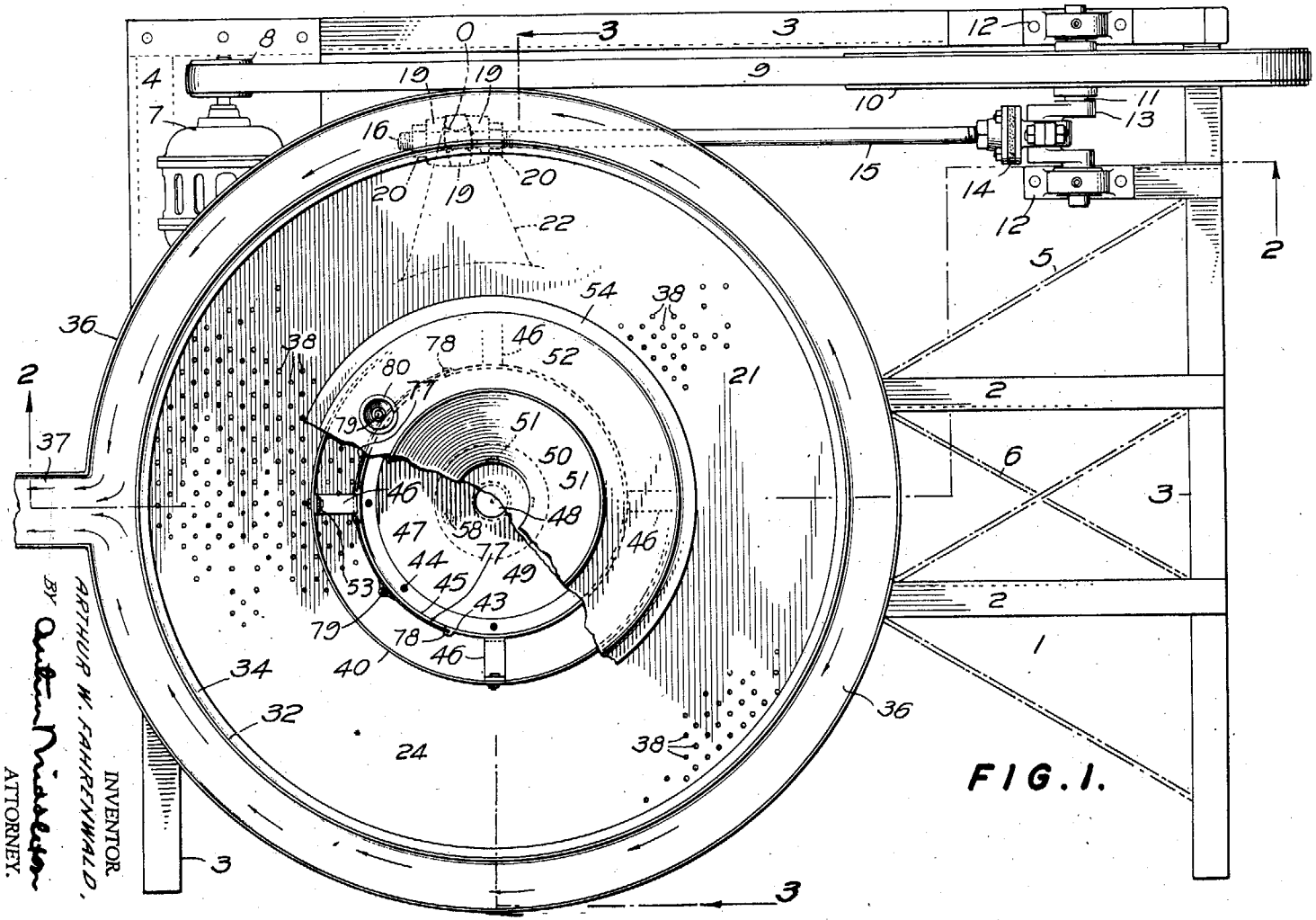
Fig. 1 is a plan view of one form of apparatus for realizing the invention hereof; in this figure certain parts are shown broken away whereby certain other parts appear either in horizontal section or in plan.
Figure 2:
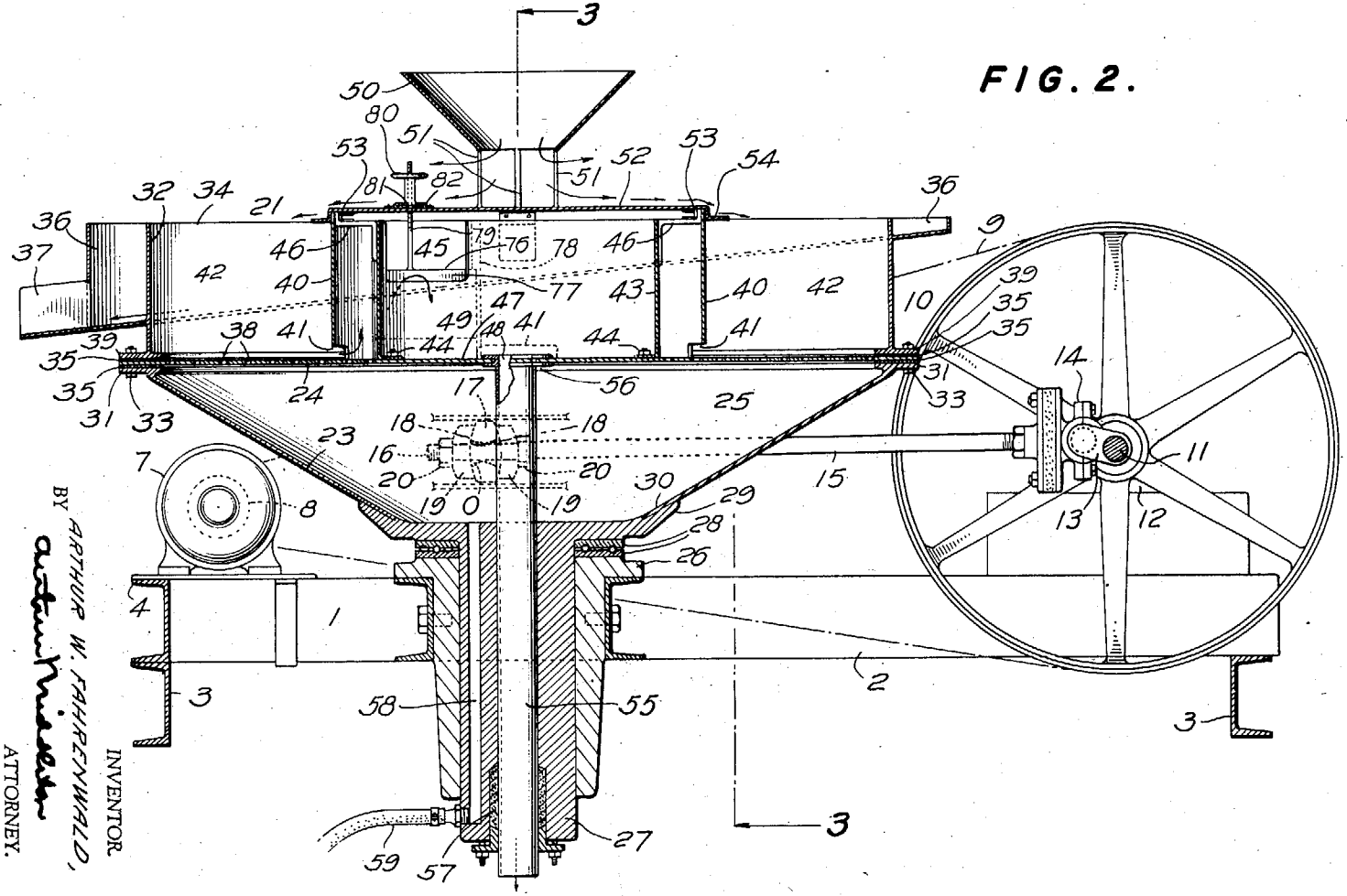
Fig. 2 is a vertical sectional view of the apparatus taken as on the planes indicated by the broken line 2—2 of Fig. 1 looking in the direction of the arrows; this Fig. 2 for convenience is referred to as a vertical longitudinal sectional view.
Figure 3:
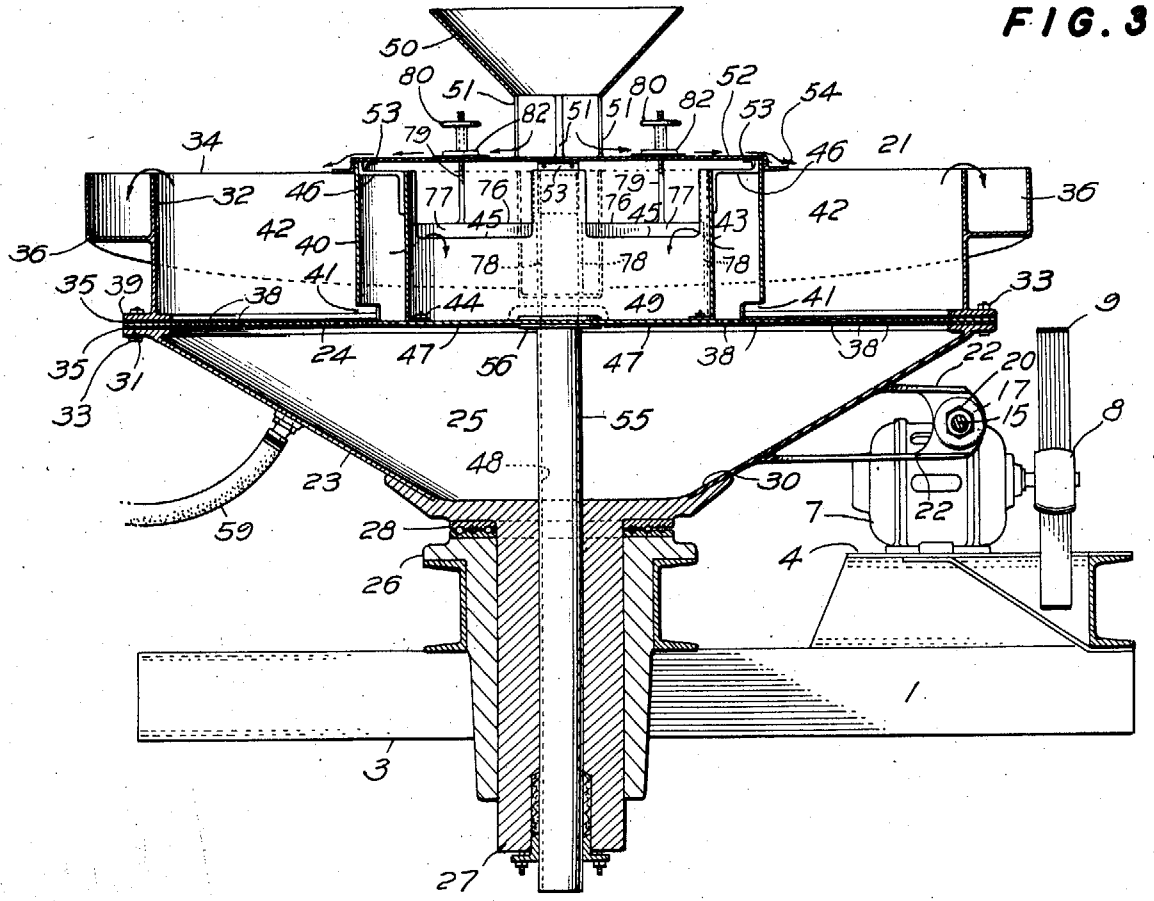
Fig. 3 is a transverse vertical sectional view taken as on the plane indicated by the line 3—3 of Fig. 1 looking in the direction of the arrows.

The embodiment illustrated by Figs. 1, 2 and 3 hereof represents that which is considered as indicative of a preferred form of apparatus as developed by me, but it is to be understood that according to the fundamental and basic aspects of this invention, the process hereof can be realized in diverse manners and the apparatus hereof can be embodied in diverse forms while still continuing to be within the purview and spirit of the invention.

*General*

A main frame 1 is provided as the main support for the classifier 21 or classifying element proper. Upon this frame there is mounted suitable motivated mechanism for imparting reciprocatory movement to said classifier or to at least some member thereof.

In each form of classifier illustrated there is a funnel-shaped member 23 underlying an apertured flow constriction member or plate as 24 (see Fig. 3) of relatively constant elevation and a cylindrical wall 32. Within the funnel-shaped member 23 and below the constriction member 24 there is provided a space 25 sometimes referred to as a hutch compartment or zone within which water under pressure is received initially. Within the cylindrical wall 32 and immediately overlying the flow constriction plate there is provided a classifying space or zone 42 wherein a liquid-solids body undergoing classification is maintained at an operative level normally determined by an overflow weir 34 (Fig. 3) of relatively constant elevation which is sometimes identified as a high or slimes weir. Water supplied under pressure to the hutch compartment 25, is forcibly passed upwardly through relatively uniformly spaced orifices 38 in that area of the constriction member 24 that comprises the lower limits or boundary of the liquid-solids body or the classification zone 42 that holds that body. The water is delivered upwardly into the lower portion of the liquid-solids body immediately overlying the orifice section. An important feature of the present invention revolves about a movement of the flow constriction member in a repetitive manner whereby there is attained an intimate and relatively uniform dispersion of the upflowing liquid within and throughout the liquid-solids body undergoing classification; and also a tangential type of engagement by the supporting surface portion of the flow constriction member with the solids in the lower portion of the body wherein mobile characteristics are imparted to a mass of suspended solids in the liquid, particularly in the lower portion of the liquid-solids body.

A motivated mechanism is therefore provided for imparting the requisite repetitive movement to the flow constriction member which movement according to the form of apparatus illustrated is a back and forth horizontal oscillatory movement within a relatively small arc about a vertically-extending axis that is concentric with the hollow cylinder or circular wall 32 that marginally defines the outermost limits or boundary of the liquid-solids body.

*Main frame*

The main frame includes longitudinally-extending beams or longitudinal channel members 2, transversely-extending headers or transverse channel members 3 and motor supporting platform 4. The frame also includes necessary tie plates as 5 and diagonal bracing elements or members as 6 all of which are suitably connected as by bolting, riveting or welding so as to form a relatively self-contained, rigid and strong supporting structure or base member.

*Motivated actuating mechanism*

A motor 7 is securely mounted upon the platform 4 and it provides a driving pulley 8 which in turn transmits through the medium of a belt 9 power to a driven pulley 10 secured to a horizontally-extending crank shaft 11. This crank shaft 11 is mounted in horizontal bearings or pillow blocks 12 suitably secured to or supported on the main frame. The crank 13 of the crank shaft 11 has connected thereto so as to be actuated therefrom end 14 of a connecting rod 15. The other end 16 of the connecting rod is referred to as the classifier end and is suitably connected at and to the outer end portion 17 of an arm 22 extending from some part of the classifier or to some member of the classifying construction carrying or having driving connection with the flow constriction member.

In the construction shown, the classifier end 16 of the connecting rod 15 has operative engagement with the outer end 17 of the arm 22 extending from the funnel-shaped member 23 which in turn carries the flow constriction plate 24 as is clear from an inspection of Fig. 3. It will hereinafter be made apparent that this arm 22, and the member by which it is carried or from which it extends, has imparted thereto back and forth oscillatory movements in horizontal directions about a vertically-extending axis, or as otherwise expressed, repetitive oscillatory movement of relatively limited arcuate range in a horizontal path. This repetitive movement is provided essentially for imparting the required movement to the constriction plate 24; (*a*) whereby the upflowing water has more uniform dispersion within and throughout the liquid-solids body; and (*b*) whereby the longitudinal engagement between the upper surface of the plate and any solids touching it will further the maintaining of the desired mobile characteristics of the liquid-solids mass. Any suitable construction may be used for operatively associating the end 16 of the connecting rod with the outer end 17 of the arm 22. In the construction shown the outer end of the arm 22 is provided with oppositely disposed curved surfaces 18 and an opening *o* for the reception of the end 16 of the connecting rod 15. It will be noted that the connecting rod end 16 is screw threaded and that upon this section there are located positionable washers or intermediate blocks 19 in the form of bearing members disposed for engaging the curved surfaces 18. These washers are normally held in place in adjusted position by nuts 20.

From what has preceded, particularly in connection with the drawings, it will be readily apparent how and why the motor actuated mechanism functions to impart repetitive movement of the desired character to the flow constriction plate.

*Classifier or classifying element proper of Figs. 1 to 3*

On the main frame there is located a bearing 26 which may be referred to as a classifier main bearing, which is secured in place on the main frame in any suitable manner as through the medium of bolts. From one point of view this bearing 26 may be considered as a part of the main frame, or as part of the stationary supporting structure, and provides a stationary or fixed supporting main bearing for a movable bearing member 27.

A movable bearing member 27 is mounted in the stationary bearing 26 in a manner whereby the movable member 27 and the parts supported therefrom and movable therewith, can have repetitive horizontal turning movement imparted thereto through the medium of the actuating mechanism heretofore referred to. In order to provide for ease of movement, an anti-friction type of bearing construction 28 or anti-friction element has been interposed between the stationary and moving bearing members 26 and 27 respectively.

The upper end of the movable bearing member 27 is provided with a flange 29 and receives the lower end 30 of the funnel-shaped member 23 that provides therein the section of the classifier which is frequently referred to as a hutch compartment and which as previously indicated is immediately below the apertured flow constriction plate 24. The funnel-shaped member 23, as the name implies, is in the form of a truncated base portion of an inverted cone and the lower or small end 30 thereof is rigidly connected in any suitable manner to the flange 29, in fact, a strong and water-tight joint is provided between them.

The upper or large end of the funnel-shaped member 23 is provided with a flange 31. The lower end of the hollow cylinder 32 is provided with the flange 39. The hollow cylinder or cylindrical member 32 provides a circular marginal wall. The cylindrical member 32 and the apertured flow constriction plate 24 are located upon the funnel-shaped member 23 and are connected thereto as through the medium of bolts 33 which pass through the flanges 31 and 39 and the interpositioned margin of the flow constriction plate 24. In order to prevent leakage through or past the bolted joint construction just referred to, suitable packing material or gaskets are provided at 35. The upper end of the circular marginal wall 32 is horizontal and provides at 34 that which may be referred to as a high slimes overflow weir of relatively constant elevation that determines the normal operative level of a liquid-solids body which is defined as to its outer marginal limits by the circular or cylindrical wall 32 and as to its lowermost limits by the flow constriction plate 24. During the normal operation of the classifier liquid with the less readily settleable or finer solids suspended therein passes over this high weir as overflow. Such overflowing liquid with the finer solids suspended therein is usually referred to as slimes. The slimes overflowing said weir 34 enter the peripheral launder 36 and pass therefrom through a discharge section 37 leading from the classifier.

As to the flow constriction member 24 this is shown as a horizontally-extending flat plate and comprises an apertured portion or apertured general section in which there are relatively small liquid upflow openings 38 that are disposed in a relatively uniform or systematic manner throughout the area or regions thereof immediately underlying the liquid-solids body undergoing solids fractionating or classifying treatment in the classifying zone of the classifier, to wit, in the annular space or zone 42.

The circular marginal wall 32 providing the slimes overflow weir 34 of relatively constant elevation, the flow constriction plate or apertured member 24, funnel-shaped member 23 of the hydraulic pressure chamber, and the movable bearing member 27 are connected so as to constitute part of a unitary structure supported for repetitive horizontal back and forth movement, that is, for horizontal back and forth oscillatory movement about a vertical axis and in a manner whereby no substantial vertical movement is imparted to said unitary structure and of which each member will consequently remain at substantial constant elevation, thereby avoiding any bodily raising or lowering of the liquid-solids body overlying the apertured constriction plate and located within the marginal wall 32. In other words, the slimes overflow weir functions at constant elevation and the flow constriction plate is reciprocated or oscillated in horizontal paths about a vertical axis while always continuing at substantially the same operative elevation without having any vertical movement imparted thereto. It will also be noted that the hereinafter referred to inwardly disposed cylindrical member or baffle 40 and an inwardly disposed cylindrical member 63 having associated therewith adjusted low solids weir 76 hereinafter referred to constitute part of the oscillatable unitary structure and said low solids overflow weir 76 when adjusted constitute low sands overflow weirs substantially at constant elevation.

The flow constriction member 24 which is shown horizontally extending flat plate is sometimes herein properly referred to as a constriction plate having a level upper surface. It is proper also to refer to this constriction plate as an orificed flow distributing flat plate.

The classifier is constructed so as to provide for the automatic discharge of the more readily settleable solids during the period of normal operation of the classifier consequent to a feed of pulp thereto to be treated and to that end there is embodied in the classifier construction means providing a solids discharge area or passageway leading from the lower portion of the liquid-solids body in the classifier, to wit, from the lower interior portion of the classifying zone 42 to a region in which the solids conveyed therethrough are distant from the classifying zone or space 42. To provide such means the classifier of Figs. 1 to 3 is constructed so as to include a baffle member below or through which there is provided a solids discharge passageway or area and also so as to include means providing a dam or low overflow weir construction. In the embodiment of said Figs. 1 to 3 the baffle member is cylindrical in horizontal cross section and is provided by an inwardly disposed cylindrical member 40 which extends downwardly from an elevation somewhat higher than that of the normal surface level of the liquid to a locality close to but vertically-spaced above the apertured flow constriction member 24 whereby the solids discharge area or passageway is provided for or left at 41 for the passage thereinto and therethrough of certain quantities of the concentrates or larger or more readily settleable type of solids found within the lower portion of the liquid-solids body in zone 42. In the construction shown in said Figs. 1 to 3 inclusive this baffle member 40 extends all the way down to the flow constriction plate 24 except for the discharge area or open sections left at 41. As part of the solids discharge means there is also included an innermost cylindrical member 43. This is connected to the flow constriction plate 24 as by means of the bolts 44 and extends upwardly therefrom. This member 43 is constructed to provide openings or passage area at 45 through which solids can pass incident to their overflowing vertically-adjustable weirs 76. The weirs 76 are herein referred to as the low solids overflow weirs and it will be noted that they are disposed at elevations lower than that of the higher or slimes overflow weirs 34. The weirs 76 are provided by and at the upper edges of curved plates 77 that substantially fit the juxtapositioned contour of the cylindrical member 43. These curved plates have vertical edges that are disposed so as to have sliding engagement in vertical guide-ways provided at 78. These plates 77 may be vertically positioned to attain any desired operative elevation for the overflow weirs 76 thereof through the medium of screw-threaded vertically-extending rods 79 and the cooperating hand-wheels or nuts 80 which have bearing portions 81 that derive support from the horizontal feed distributing plate 52 and which are turnably held thereupon by the retaining rings 82. The weir 76 when in adjusted normal operative position functions substantially as a low sands overflow weir of constant elevation. In the construction shown the cylindrical baffle member 40 is directly secured to the cylindrical low weir providing member 43 in any suitable manner as by means of brackets or connecting braces 46. The result of the construction described is that the outermost or cylindrical marginal wall 32, the cylindrical baffle member 40 and the inner cylindrical low weir providing member 43 all have the same angular oscillating movement imparted thereto as that which is imparted to the funnel-shaped member 23, and thereby to the flow constriction plate 24.

The central section 47 of the flow constriction plate 24 is solid or imperforated except for the central discharge opening 48 provided for the down passage of the heavier larger solids, to wit, the sands or concentrate which are discharged therefrom into and downwardly through a depending sands discharge pipe or conduit 55.

The inner cylindrical member or low solids overflow providing plate 43 has a relatively water-tight bolted connection with the central section 47 of the flow constriction plate whereby a sands receiving space is provided at 49. The pipe or conduit 55 has a water-tight connection at 56 to the imperforated central section 47 whereby there is avoided the leakage of pressure water from the hutch compartment 25 into the sands receiving space 49. The pipe or conduit 55 passes downwardly through the movable main bearing 27 and is provided whereby sands can freely pass from the sands receiving space 49 to a region outside of or remote from the classifier. Suitable provision is made, to wit, such as is accomplished by packing material as at 57 for preventing the outflow or escape of pressure water from between the exterior of the conduit 55 and the movable bearing 27 through which it extends.

It has been pointed out that the liquid-solids body undergoing treatment is defined as to its outermost marginal limits by the cylindrical marginal wall 32. As to its innermost limits it is defined by the cylindrical baffle member 40. The members or parts 32, 24 and 40 just referred to delineate or outline the space or zone which has been designated as 42 and which has herein been referred to as the classifying zone. In this zone there is maintained a liquid-solids body of constant volume but in which the specific gravity or effective hydrostatic pressure head at the bottom is changeable as according to changing rates of feed, differences in types of pulp supplied, or even other operating conditions which may be experienced as the process continues.

A feeding means for the pulp to be treated comprehends a small hopper 50 which is supported through the medium of horizontally-spaced legs 51 extending upwardly from a horizontal feed or pulp distributing plate 52 that is secured to the upper end of the cylindrical baffle member 40 as by means of angle irons or brackets provided at 53. The outer edge portion 54 of this distributing member 52 is preferably at or proximate the normal surface level of the liquid-solids body in the classifier whereby the pulp dropping or plunging therefrom for classifying treatment is discharged into the liquid-solids body without creating undue disturbance therein.

Reference has heretofore been made to the fact that the chamber 25 below the construction plate 24 and within the funnel-shaped member 23 may be referred to as a hutch compartment. This same compartment 25 may be referred to as a pressure chamber wherein water is received that is supplied thereto through the medium of a tubular flexible connection provided at 59.

During the normal functioning of the machine water is supplied under pressure through this connection and forcibly upflows from the constriction plate into the lower portion of the liquid-solids body which is maintained within the fractionating or classifying zone 42 of the classifier.

In the instance of certain pulps very fine solids of heavy specific gravity pass downwardly through the orifice portions of the constriction plate into the underlying space or hutch compartment. This particularly has reference to particles of relatively heavy material such as gold. These hutch products are obtainable from said compartment because of a passageway 58 leading downwardly through the movable bearing member 27 and may be collected therefrom through the medium of a flexible connector provided at 59.

Figure 4:
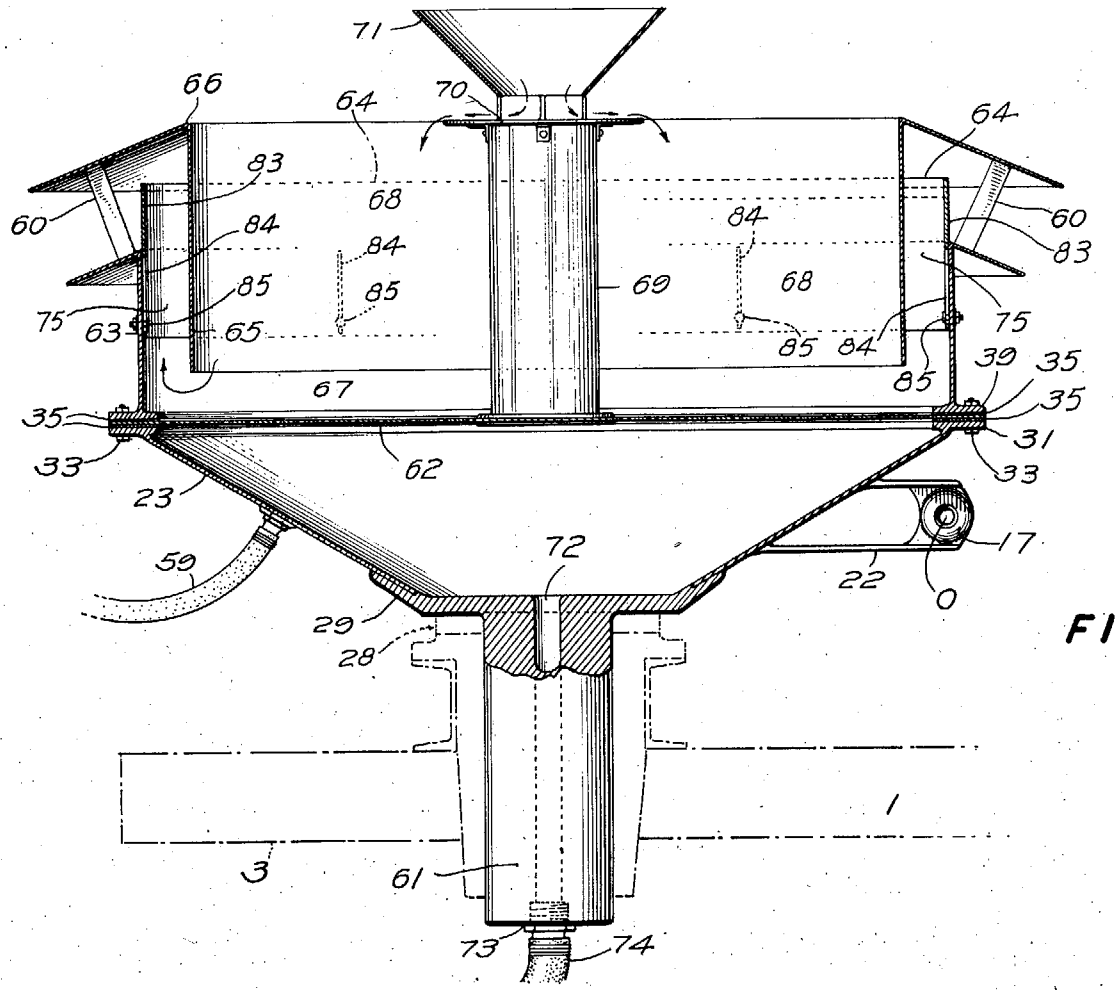
Fig. 4 is a view diagrammatically illustrative of features of certain operating parts of another form of apparatus by which the invention may be realized.

*Classifier of Fig. 4*

The form of apparatus typically illustrated by Fig. 4 follows the principle of construction already described in connection with the form of apparatus illustrated by Figs. 1 to 3 inclusive but certain differences as to specific features thereof will be apparent from that which follows:

According to the form of Fig. 4 there is employed the funnel-shaped hutch member 23 that is mounted on the flange portion 29 of a movable bearing member 61, which is normally mounted on a stationary main bearing as 26 of Figs. 1 to 3 and in the same manner that the corresponding movable main bearing 27 of Figs. 1 to 3 is mounted. This hutch member also carries an apertured flow constriction plate 62 of substantially constant elevation and an outermost cylindrical wall 63 above the plate, all of which are suitably secured together as by bolts after the manner of the similarly shaped parts of the apparatus shown in Figs. 1 to 3. Water is supplied under pressure as by the flexible connector 59 to the interior portion or hutch compartment which is within the funnel-shaped member 23 and below the flow constriction plate 62. In the instance of the form of Fig. 4 the cylindrical member 63 which extends upwardly from the perforated plates has associated therewith a vertically-adjustable cylindrical member 83 that is constructed so as to provide a vertically-positionable overflow weir 64. This weir 64 when secured for normal operation functions as a low sands overflow weir of substantially constant elevation. This weir 64 is sometimes referred to as a low solids overflow weir and is at an elevation lower than that of the higher slimes overflow weir 66 of substantially constant elevation. The cylindrical member 83 has vertically-extending slots or openings 84 for receiving bolts 85 thereby providing a construction arrangement by which vertical adjustment for the low slimes overflow weir 64 can be realized. The exterior of the positionable cylindrical member 83 is such as to substantially fit the interior of the outermost cylindrical wall 63 and when secured in place by the bolts 85 in effect becomes an extension or part of the marginal wall of which the outer cylindrical member 63 constitutes a part.

A second cylindrical member 65 which is inwardly and concentrically disposed with respect to the cylindrical member 63, is fixedly secured to the latter through the medium of horizontally-spaced brackets or supports 60 whereby it is fixedly positioned with respect to the cylindrical member 63 and the underlying constriction plate 62. This second cylindrical member 65, however, extends to an elevation higher than that of the outer cylindrical member 63 and is provided at and along the upper margin thereof with an overflow weir 66 which is sometimes herein referred to as a high slimes overflow weir. From the drawings it will be noted that the slimes overflow weir 66 is at an elevation higher than that of the solids overflow weir 64. The cylindrical member 65 extends downwardly to regions proximate the perforated plate, in fact, it is feasible to extend parts thereof all the way down to said perforated plate. However, there are provided or left in or below the lowermost portion thereof solids discharge area or passageways 67 leading from the lower portions of the interior section providing the classification zone 68 to the exterior of the classifying space, or what is the same thing, to a region 75 that is exteriorly located with respect to the liquid-solids body that is maintained in the classifying zone 68. The cylindrical wall 65 marginally defines the outermost limits of classifying space wherein the liquid-solids body is located while undergoing the fractionating treatment.

The apertured flow constriction plate 62 has connected thereto a small innermost cylindrical construction or column 69 concentric with the marginal cylindrical wall 65 just referred to. This smaller cylindrical member or column constitutes a support at the upper portion of which there is carried a feed distributing plate 70 which in turn supports a feed hopper construction 71 similar to that employed in connection with the form of apparatus shown in Figs. 1 to 3. In the instance of the construction of Fig. 4 the movable bearing member 61 is provided with only one opening extending downwardly therethrough, namely, opening 72 for the delivery therethrough of the hutch products and from which there extends a flexible hutch delivery pipe or conduit 74 that is connected by coupling 73 to the lower end of the movable bearing member 61.

*Operation of the apparatus*

The expression "pulp" as employed herein implies any liquid containing suspended solids of different sizes of which the larger sizes are more readily settleable than are the smaller sizes. This expression may also comprehend liquid containing suspended solids of which some are of a type that are more readily settleable than others because of a difference in the specific gravity of the solids, or it may include suspended solids some of which have different specific gravity from others and some of which have different sizes as compared with others with the result that some of the solids are readily settleable while others are less readily settleable. Pulp also includes that which is known as metallurgical pulp. It may include that which is a suspension of sand and fine clay. It may be a metallurgical type of pulp of which there are fine solids not readily settleable, of which there are coarse solids that are readily settleable and of which there are other solids in very fine sub-division or of small particle size which are more readily settleable than the large solids because of their much greater specific gravity as compared with that of the larger but less readily settleable solids. An instance of this is realized by the small gold particles in metallurgical gold bearing pulp.

The material to be treated may be in relatively dry form but when acted upon for classification, it must be in the form of liquid-solids mixtures, or suspensions. The process hereof is one involving the separation of suspended solids by a hydraulic classifying operation into the more readily settleable and the less readily settleable groups with the line of demarcation between the groups being controllable at will. In starting the operation, there is first established a liquid-solids body or suspension within a liquid-holding or classifying zone of the classifier. This compartment is marginally defined by a cylindrical wall of the classifier that has associated with it a perforated flow constriction plate that defines the lowermost limits of the liquid-solids body.

The cylindrical baffle member 40 of Figs. 1 to 3 or the cylindrical central column 69 of Fig. 4 constitutes inwardly disposed members circular in cross section that in effect define the innermost limits of the classifying zone and of the liquid-solids body within said classifying zone. Thus in each form, the classifying zone or area for the maintained liquid-solids body is comprised within the space between the concentric marginal body-defining wall on the one hand and the cylindrical structure defining the innermost limits of the liquid-solids body on the other hand. This classifying zone and its liquid-solids body is defined as to its lowermost limits by the flow constriction plate whose apertures or discharge orifices are directly below the liquid-solids body.

Assuming that a liquid-solids body or suspension has been established within the classifying compartment and that the flow constriction plate is being reciprocated or oscillated so as to maintain the mobile suspension characteristics for the solids within the liquid-solids body, then during the normal operation of the machine, there is provided a continual supply of water under pressure into the hutch compartment so that it can flow upwardly through the orifices of the constriction plate and enter in the form of jets the lowermost portions of the liquid-solids body. The mechanism for imparting horizontal oscillating movement to the flow constriction plate continues in operation. The repetitive back and forth movements of the horizontal constriction plate cause a tangential type of engagement between it and the heavier or settled solids in the liquid-solids body as they drop or settle into contact therewith, with the result that there is a slight oscillatory movement imparted to these solids, of decreasing intensity with increasing distance from the plate so as to cause a relative movement of adjoining planes and a mutual rolling effect all resulting in imparting to the solids individual as well as group mobility. This mobile state or condition will continue to be maintained even though the supply of water under pressure should be temporarily cut off and even though there is no pulp feed being introduced into the classifier. Assuming, however, that water is being supplied under pressure to the hutch chamber so that it flows upwardly through the orifices as jets into the liquid-solids body and assuming that no feed is being introduced into the machine at that particular time, then practically the sole result will be upflow and outflow of liquid with only a relatively small amount of fines therein to and past the high slimes weir. There will be no appreciable outflow of solids past the low weir because there is a substantial quantity thereof at the delivery side of the solids discharge area or openings, as 41 of Figs. 1 to 3 and ahead of the low solids overflow weirs provided as by weir or weirs 45 of the same figures. Such collection of the heavier settleable solids outside of the classifying zone is sufficient to impart a relatively constant density to the outside liquid-solids mixture comprising the same and thereby there results a relatively predetermined constant back pressure that continuously functions to oppose the outflow of solids or liquid from the bottom of the body to the regions outside of the classifying zone, to wit, through the discharge openings or area 41 leading from the classifying zone.

Now assuming the case where the supply of pulp is relatively continuous, the pulp is continually fed from the hopper over the distributing plate where it is suitably discharged into the classifying zone. Under such conditions there is an accompanied loading of solids into the liquid-solids body with the result that there is an increase in density of the entire liquid-solids body within the classifying zone and a consequent increase in hydrostatic head of the material at the bottom or lower portion of the liquid-solids body in said zone. The upflow or pressure water through and from the orifices of the flow constriction member and thence into the liquid-solids body has not been interrupted and the mobile characteristics of the body are continued and maintained because of the oscillatory movement which is continuously imparted to the flow constriction member. This results in the continual or ever-changing position of the solids in the mobile mass within the liquid-solids body whereby the finer particles of the solids are released and passed upwardly and ultimately outwardly as fines suspended in the liquid overflowing the high slimes weir. At the same time because of the increase in density and consequent increased hydrostatic pressure the pressure at the bottom of the bed becomes sufficient to overcome the constant back pressure or liquid balance whereby there can and does follow an outflow of the sands, settled solids, or concentrate as they may be called, into and through the solids discharge area or openings as 41 of Figs. 1 to 3, or 67 of Fig. 4, and whereby some of the solids which have heretofore passed the discharge openings or area will be elevated to a position whereby certain quantities can be hydraulically transferred over the vertically-positionable low solids discharge weirs provided as at 45 in Fig. 3, or by the relatively continuous vertically-positionable low solids discharge weir 64 of Fig. 4. The solids which are thus discharged past the low discharge weir 45 of Fig. 3 are received within the space 49 which is immediately over the central section 47 of the flow constriction plate 24. From the sands receiving space 49 the discharged solids, sands or concentrates pass downwardly through sands discharge tube or conduit 55 and ultimately from the classifier. In respect to the process and apparatus hereof the following features will be noted:

The process involves the establishment of a liquid-solids body which is peripherally defined preferably by a cylindrical marginal wall, and which is defined as to its lowermost limits by a constriction plate having openings leading upwardly therethrough which are distributed relatively uniformly throughout the area immediately underlying the liquid-solids body. The flow constriction plate is actuated so as to maintain mobile characteristics of the settled sands mass established in the lower portion of the body. The position of the sands in the body or mass is continually or ever changing relative to each other due to this back and forth repetitive movement of the constriction plate and the ever-changing position of the sands is further aided by the water upflowing into the lower portion of the liquid-solids body. There is a constant outflow of slimes, to wit, liquid with fine or less readily settleable solids suspended therein, over a high slimes overflow and a relatively simultaneous or consequent outflow of sands or concentrate particularly when the density or hydrostatic head within the body is sufficiently great to force the sands or settled solids outwardly through discharge area provided therefor against a constantly maintained back pressure. The constant back pressure is sufficiently great to insure the retention in the liquid-solids body of the mobile characteristics thereof even when there has been a cessation of feed thereto. There is a hutch compartment or receiving space below the apertured constriction plate. There is provided means for removing from the hutch compartment or chamber such products or fine solids as may have been passed downwardly through the flow discharge openings or orifices of the constriction plate incident to the normal functioning of the machine. The constriction plate has imparted an oscillatory or reciprocatory motion thereto. The action or movements imparted thereto are relatively light and fast and are not of a character to impart more than a local movement or horizontal shearing type of action to the lowermost portion of the liquid-solids body as a whole with the result that the upper portions of the liquid-solids body remain at a uniform level in a relatively quiescent state in so far as the reciprocating movements of the constriction plate or member are involved. The horizontal reciprocation of the flow constriction member or flow constricting member, as it may be called, also effects a shearing action on the liquid upflowing therefrom; it serves as a flow distribution or flow distributing member whereby the upflowing liquid is disposed relatively uniformly within and throughout the solids of the liquid-solids body, all of which aids in eliminating and avoiding pulp banks, dead spots, local boiling or pot holes in the liquid-solids body. The portion of the structure which defines the inner and outer margins or limits of the liquid-solids body are cylindrical or circular in cross section and are concentric with respect to each other and with the axis about which they oscillate. Reliance is made upon the physical phenomena that even though the circular body-defining members have repetitive back and forth movement they do not impart or allow any lateral—viz., horizontal—bodily movement of the liquid-solids body contained therein and that in so far as their movements are involved the liquid-solids body as a whole remains relatively stationary. For this reason these cylindrical members which define the innermost or outermost limits of the liquid-solids body may be referred to and described as so mounted and of a character that they hold the liquid-solids body in and restrain it against any lateral bodily movement even though the apertured flow constriction member or plate underlying the body has repetitive movement imparted thereto.

The upflow of liquid under pressure from the flow distributing openings of the constriction plate into the lower portions of the body of liquid overlying the constriction plate must be in quantities and at velocity rates for realizing the classifying and fractionating operation and it must be sufficiently low to avoid pot holes or boiling in the body. The arrangement of the flow distributing openings in the constriction plate is preferably practically uniform throughout more particularly that portion of the flow distributing member which is immediately below the liquid-solids body in the classifying zone and the repetitive movement of the flow constriction plate is for the purpose of effecting an intimate dispersion of the upflow liquid in and throughout the solids of the liquid-solids body and for imparting and maintaining the mobile characteristics of the mass of heavier settled solids and the liquid containing the same whereby they automatically hydraulically pass from the interior of the classifier zone to the exterior thereof against the constantly maintained back pressure as and when the hydrostatic head or pressure within the classifying zone is sufficiently great incident or consequent to the feeding of pulp to and loading of the liquid-solids body particularly with the more readily settleable type of solids. The upflow of liquid from the perforated plate into the liquid-solids should be at a rate sufficient to place the fines in the upper portion of the bed in hydraulic teeter while there is a hindered settling condition in the lower portion of the bed when the solids settling through the teeter zone assume a crowded but mobile state.

I claim:

1. In the classifying of pulp solids containing sands and finer or lighter solids, the method comprising maintaining conditions of hydraulic teeter in a liquid-solids body, feeding the pulp to the upper portion of a liquid-solids bed, marginally defining said bed against lateral bodily movement, defining the lowermost limits of said bed by a level constriction plate having numerous liquid discharge orifices disposed substantially throughout the area thereof that is immediately below the marginally defined bed, providing a solids discharge area leading from the lower portion of said bed to regions spaced therefrom, continually passing liquid under pressure from the liquid discharge openings of said constriction plate upwardly into the bed at uniform relatively non-pulsating velocity rates sufficiently high for the classifying or fractionating operation but below rates apt to create eddying therein, avoiding imparting repetitive vertical movements to said constriction plate but continually imparting to said constriction plate repetitive horizontal oscillatory movements of relatively limited arcuate range about a vertically extending axis whereby the settled solids of the bed as well as teetering solids thereof constitute a mobile mass, overflowing as slimes liquid with certain of the lighter or finer solids therein marginally from the normal level of the liquid, imposing a relatively yieldable but maintained back pressure constantly acting in opposition to the outward passage of sands into, through and from the solids discharge area and functioning to prevent outward passage of sands except when automatically overcome by that sufficiency of outwardly directed pressure which follows consequent to the feeding of pulp during the normal performing of the process whereby to avoid any excess accumulation of sands within the bed.

2. In operative combination in a continuous classifier for fractionating pulp embodying readily settleable sands and solids that are less readily settleable, a container for a mixed liquid-solids body including inner and outer body defining annular walls and a bottom flow distributing member with flow discharge orifices distributed throughout the area immediately underlying said body which is located so that it surrounds the inner annular wall and which is marginally limited by the outer marginal wall, means for supplying water under pressure to the underside of said flow distributing member for forcible delivery upwardly into and from said discharge orifices, means for imparting to said flow distributing member repetitive horizontal movements to further the distribution of water within the bed and for imparting movements favorable to the maintaining of the settled solids in the body in a mobile state and at the same time avoiding imparting to the flow distributing member any repetitive up and down movement whereby to avoid bodily raising or lowering of the mixed liquid-solids body, a high slimes weir functioning at constant elevation that is the same as the normal operative level of the body and over which liquid with lighter solids suspended therein continually pass as effluent from the classifier, and settled solids outflow means including a sands passageway and a sands overflow weir normally functioning at constant elevation lower than that of the slimes weir whereby sands in said passageway offer constantly acting back pressure against which sands move and outflow as they accumulate during the normal feeding of pulp to the body to overcome the continuously acting back pressure, the back pressure being sufficient to insure retention of enough sands in the body to maintain an individually mobilized mass of settled sands in the body.

3. In operative combination in a continuous classifier for fractionating pulps bearing suspended solids in the form of readily settleable sands and finer solids which are less readily settleable, means providing a circular wall for marginally confining a mixed liquid-solids body and for retaining said body against lateral bodily movements, a horizontally-movable constriction plate providing a level upper surface of constant elevation disposed below said wall so as to define the lowermost limits of the body and provided with flow-discharge orifices immediately below the body, means for supporting the flow constriction plate whereby it can have imparted thereto repetitive horizontal oscillatory movements about a vertically-extending axis concentric with the circular wall and without having bodily up or down movements for thereby avoiding any bodily raising and lowering of the mixed liquid-solids body incident to such repetitive movements, feeding means by which incoming pulp is continuously delivered and distributed to the upper portion of the body, means associated with the flow constriction plate disposed at the underside thereof for providing a pressure chamber adapted to receive hutch products passing thereto downwardly through the apertures of the constriction plate, means for continuously supplying hydraulic water under pressure into the chamber and therefrom upwardly through the orifices of the plate into the overlying liquid body and under pressure sufficient to maintain conditions of hydraulic teeter in the body, marginal outflow means having a circular high overflow section that rises to the normal operative surface level of the body while concentric with respect to said vertical axis and by which liquid with certain of the finer solids continually pass as slimes from the body, means for horizontally oscillating the constriction plate relative to the liquid body for thereby furthering the distribution of water into and through said body which is normally ever changing and for imparting tangential movement to the settled solids immediately over and which from time to time may engage the upper surface of the flow constriction plate, solids-discharge means leading from the lower interior portion of the body-holding section and provided with a baffled circular low sands overflow weir of normal constant elevation and concentric with said vertical axis for permitting the automatic outflow of heavier solids from the lower portion of the liquid body consequent to increase in the density of the body incident to the continuous feeding of pulp to the body, and means for passing hutch products from the lower interior portion of said pressure chamber.

4. A continuous classifier for metallurgical pulp and the like comprising in operative combination a container functioning at a constant elevation for a maintained liquid-solids body having circular confining walls with a marginal slimes overflow weir at the upper portion thereof normally functioning at constant elevation and a bottom constriction plate with flow discharge orifices distributed throughout the area immediately below the body within said circular confining walls and also normally functioning at constant elevation, a casing member providing a hutch compartment therein at the underside of the constriction plate, supporting bearings by which the container is supported to permit oscillatory movement of limited arcuate range in horizontal paths about a vertically-extending axis but so that no vertical movement is imparted to the container, means for supplying water under adjustable pressure to the interior of the hutch compartment and for thereby forcibly delivering water into the flow discharge orifices and upwardly therefrom at relatively uniform flow rates and in a manner whereby pulsated delivery is substantially avoided, means for imparting horizontal oscillatory movements to said container, and settled solids discharge means providing an outflow passage leading from the lower interior portion of the container and having a settled solids overflow weir normally at constant elevation and at elevation lower than that of the slimes overflow weir.

5. An apparatus of the class described comprising in operative combination a liquid holding structure embodying an apertured horizontally-extending flow constriction and distributing member, means for imparting reciprocatory horizontal movements thereto without imparting up or down movements thereto, means for supplying water constantly for delivery relatively uniformly upwardly from the apertured portion of the member into the region immediately above the same, a marginal wall extending upwardly to a point above the apertured member and providing with the latter a classifying space wherein a liquid-solids body is located and normally maintained while undergoing treatment for the fractionating of the solids into different groups of fines and sands and which marginal wall is disposed so as to hold said body against lateral bodily displacement, a fines overflow weir of normal constant elevation that determines the normal level of the liquid body which is laterally confined by the marginal wall, and means leading upwardly from the lower portion of said liquid-solids body and providing a sands overflow weir of normal constant elevation and disposed at an elevation lower than that of the first mentioned weir whereby as the apparatus normally functions sands will be hydraulically passed from the lower portion of the body and ultimately will be delivered over the lower sands overflow weir.

6. The process of classification comprising feeding a stream of solids in liquid suspension to a pool having a classifying zone whose liquid level is fixed during normal operation by a top edge weir normally functioning at constant elevation and whose lower limit is a horizontally-extending perforated plate having associated therewith a low weir normally functioning at constant elevation together with a baffle disposed functionally ahead of the low weir adapted to prevent an outward passage towards the low weir of liquids except such as pass under said baffle; continually imparting horizontal oscillatory movements to the plate in a manner whereby the plate has repetitive back and forth horizontal angular movements relative to the overlying pool and in a manner whereby there is avoided imparting of any up or down movement to the plate; continually flowing over the top edge weir a selected fraction of suspended solids from the zone; maintaining in the pool at elevation lower than that of the top edge weir and contiguous to the plate a bed of solids in mobile suspension; continuously effecting passage under the baffle and over the low weir a selected fraction of said suspended solids by supplying to and distributing throughout the lower portion of the zone upflow currents of liquid passing thereto through the perforations in the plate at a rate for maintaining teeter conditions within the pool; and controlling the character of solids selectively passing to the respective fractions principally by the vertical distance between the elevations of the top edge and low overflow weirs.

7. Classification apparatus comprising a tank, a substantially horizontal perforated plate dividing the tank into an upper and a lower compartment, the upper compartment being adapted to serve as a classification zone for holding a pool of liquid having suspended solids some of which settle as a subnatant bed overlying the plate, feed means for the upper compartment, means for supplying liquid constantly under pressure through the perforations of the plate; the compartment below the plate being adapted to function for holding liquid under pressure, means for supporting the plate at constant elevation but which permits horizontal movement of the plate, means for imparting repetitive horizontal oscillatory movements to the plate about a vertically-extending axis, a high annular overflow weir edge for the upper compartment and a low annular weir edge for the lower compartment, baffle means functionally disposed between said weirs and extending downwardly towards the plate into a region proximate the low weir adapted to provide at the lower end thereof a transfer passageway leading towards the low weir while restricting flow of liquid from the compartment past the low weir, said weirs and baffle being concentrically disposed with respect to the axis about which the perforated plate oscillates.

8. Classification apparatus comprising a chamber adapted to hold at fixed elevation and against bodily horizontal displacement, a classifying bath of suspended solids having a boundary wall and a bottom that includes a perforated plate, means for supplying a feed of classifiable solids into the upper portion of the bath, a suspended fines overflow edge weir of substantially constant elevation extending to the normal liquid level of the bath and disposed substantially marginally of the bath, means providing an upflow passage for sands, a sands overflow edge weir of substantially constant elevation whose upper edge is substantially lower than that of the elevation of the edge of the fines weir, means for horizontally oscillating the plate about a vertically extending axis but for limited arcuate range for imparting mobility to a submerged bed of settled sands in the lower portion of the bath but at the same time avoiding imparting any substantial vertical bodily movement to the plate, and means for passing water at relatively constant velocity upwardly through the perforations of the plate and through the mobilized bed of sands under pressure sufficient to cause classifying teeter in the bath as well as to upflow classified fines over the fines overflow weir while permitting settling of classified sands to the mobilized bed of sands, the differential in elevation as between the high fines weir and the lower sands weir controlling the height of the mobilized bed of sands whereby newly classified sands therein cause a corresponding displacement of sands through said passageway and over the sands weir.

9. A method of classification which comprises maintaining at relatively constant elevation and against lateral displacement a classifying bath of suspended solids having a horizontally movable perforated plate normally maintained at constant elevation, distributing a feed of classifiable solids applied to the bath substantially at the surface thereof; balancing the bath containing a bed of settled solids disposed adjacent the plate with an adjustable height of classified sands and water outside of the bed; continually upflowing water at sufficient pressure through the perforations of the plate and through the bed of sands whereby to effect a classification of the fed solids at the desired cut of sizes in a hydraulically mobilized portion of the bath above the bed of sands and to overflow classified suspended fines therefrom over and past a high weir edge of relatively constant elevation; horizontally oscillating the plate relative to the bed through a limited arcuate range about a vertically extending axis for contributing to the maintenance of the bed of sands in individually mobilized condition; and continually discharging from said column beneath a baffle and over a low overflow weir of relatively constant elevation sands in quantity equal to newly classified sands settling to the bed as a result of the classification action thereupon.

ARTHUR WILLIAM FAHRENWALD.